Patented Mar. 20, 1951

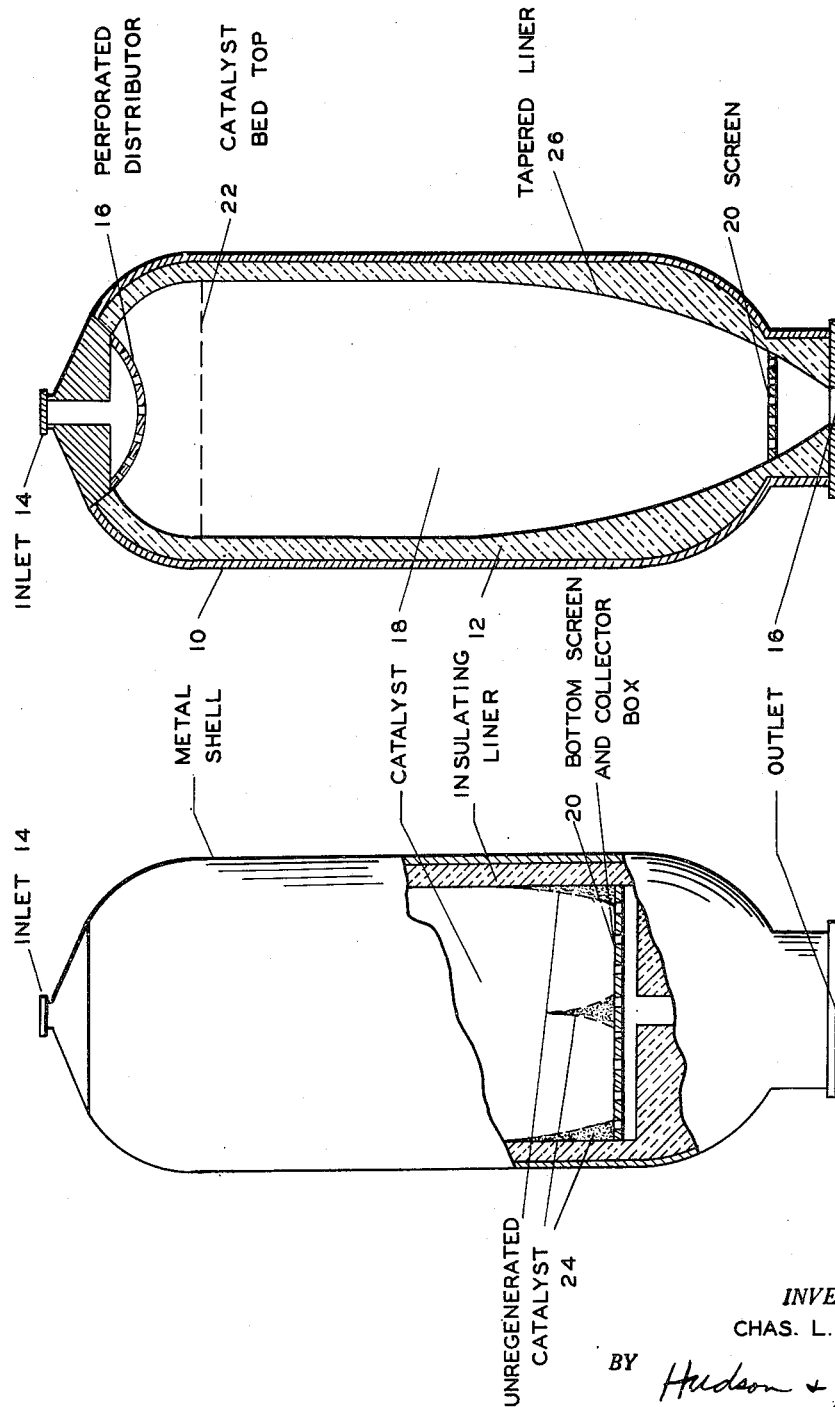

2,546,044

UNITED STATES PATENT OFFICE 2,546,044

CATALYST CHAMBER CONSTRUCTION

Charles L. Rogers, Phillips, Tex., assignor to Phillips Petroleum Company, a corporation of Delaware Application February 1, 1946, Serial No. 644,948

4 Claims. (Cl. 23—288)

This invention relates to an improved catalyst chamber. In a specific embodiment it relates to a method of determining the optimum shape of a catalyst chamber, and a chamber constructed in accordance therewith, particularly adapted for effecting conversions of organic reactants at high temperatures in which the catalyst must be periodically reactivated by passage of hot oxygen-containing gases therethrough.

The use of bodies of solid contact material to treat fluids of many kinds is well known. Among the most important commercial processes are to be found those involving the treatment of hydrocarbons and other organic materials at elevated temperatures. Such treatments may be physical or chemical in nature, or both. At the elevated temperatures normally employed, a certain amount of undesired carbonization of the reactants is inevitable. As a result the body of catalyst or contact material gradually decreases in activity, and after a period of time which, depending on the particular case, may range from ten minutes up to several days, the flow of organic material through the catalyst must be stopped in order that the catalyst may be reactivated. This is accomplished by purging the catalyst of residual reactants, followed by passing an oxidizing gas through the catalyst. This oxidizing gas is ordinarily air, and temperatures are maintained which are adequate to effect combustion of carbonaceous material from the surface of the catalyst, for instance from 700° F. up to 1500° F. or higher. It is important that the temperature not be allowed to exceed that above which the catalyst will be permanently impaired in activity.

In the usual catalyst regeneration of the nature described, a burning zone begins at the surface of the catalyst nearest the air inlet and gradually progresses through the bed of catalyst in the direction of flow of gas until the outlet is reached. Most of the oxidation occurs in this burning zone, although a limited amount takes place concomitantly in other portions of the chamber. Oxygen content, flow rate, and initial temperature are controlled as carefully as possible to limit the temperature of the burning zone. After the combustion gases leave the burning zone they pass through the remainder of the catalyst bed, imparting some of their heat thereto prior to leaving the catalyst chamber. The outlet portion of the chamber thus is hot for a longer period than the inlet, and when the burning zone approaches the outlet, the catalyst bed in that region and consequently the chamber walls become quite hot.

The time used for regenerating the catalyst is selected as optimum from an economic standpoint. To remove absolutely all of the carbon from the catalyst is ordinarily not necessary or even desirable, but it is very important that the carbon removal be uniform throughout the catalyst bed. I have found in practice that catalyst near the outlet of the standard cylindrical catalyst chamber does not undergo uniform reactivation. After carrying out the conversion-reactivation cycle a number of times I have found that certain portions of the catalyst bed in the outlet half of the chamber, particularly along the walls thereof, become more or less permanently coked. This is apparently due to small flow rates through the area in question either in the conversion or regeneration portion of the cycle and very probably both. A slow rate during conversion results in unduly long residence time of the organic reactants in the given portion of the catalyst with consequent over-reaction, cracking and coking. This causes a greater deposition of carbon than in the balance of the catalyst bed. On regeneration the slow flow rate results in less carbon removal than in the rest of the catalyst bed so that either a very long period of time must be spent for regeneration to insure complete removal of carbon throughout the bed, or flow of regeneration gases must be stopped before all of the carbon is removed in order to proceed with the next conversion step without loss of time and excessive use of air.

In practice the latter procedure is the only practical operation. The result, however, is that certain areas of catalyst still contain carbon which is being actively burned at the end of the regeneration step. The short purge which is used between the regeneration and subsequent conversion does not allow sufficient time for these burning spots to become cooled to the general catalyst bed temperature level. Accordingly, upon initiating flow of reactants through the catalyst chamber very severe cracking occurs at these hot spots with consequent serious deposition of carbon, and decomposition of reactants to form undesired light gases. This not only fouls the catalyst bed and wastes reactants, but likewise prevents smooth operation of the overall process because of uneven product distribution between the first part of the conversion cycle and the last of the conversion cycle.

Another result is that the wall of the catalyst chamber contiguous to the carbonized portion of the catalyst is subject to frequent failure, necessitating shut down of operations, dumping of catalyst not yet utilized to its fullest extent, and extensive repairs. This wall failure may perhaps also be partly attributed to uneven heating of the chamber shell caused by higher temperatures in the outlet region.

The foregoing discussion is applicable to any of the well-known conversions carried out at elevated temperatures alternately with catalyst reactivation. As examples of such conversions may be mentioned cracking, aromatization, polymerization, alkylation, dehydrogenation, desulfurization, and clay treating of hydrocarbon fractions, alkylation of phenols with olefins, and many other reactions. The catalysts are chosen with due regard to the particular reaction, and may be alumina, silica, synthetic silica-alumina gels, chromium oxide gels, bauxite, acid-treated montmorillonite, and the like, in the form of granules or pills in a stationary catalyst bed.

An object of this invention is to provide an improved catalyst chamber. Another object is to improve the operation of processes in which a solid contact material is alternately on-stream for treatment of organic fluids at elevated temperatures and on-stream for reactivation by an oxidizing gas. A further object is to save the cost of installing catalyst which is not efficiently used. Another object is to eliminate trouble encountered with wall failure in a conventional cylindrical chamber. Yet another object is to increase the air efficiency during catalyst regeneration by enabling the removal of carbon from all portions of a catalyst bed uniformly. A further object is to avoid the formation of hot spots in catalyst beds during regeneration. Yet another object is to minimize undue production of gas when first switching from catalyst regeneration to conversion. Other objects and advantages of the invention will be apparent to one skilled in the art from the accompanying disclosure and discussion.

I have found that the foregoing difficulties may be obviated by constructing a catalyst chamber in the light of knowledge gained by an examination of catalyst used in an ordinary cylindrical catalyst chamber for a series of cycles involving alternate conversion and regeneration. This is shown in the accompanying drawing, in which Figure 1 represents somewhat diagrammatically a vertical cross-section of a conventional catalyst chamber, while Figure 2 shows diagrammatically in vertical cross-section one preferred embodiment of my improved chamber. In the drawing, where like numerals are used in each figure to denote like parts insofar as possible, each chamber comprises an outer substantially cylindrical metal shell 10. This shell is lined with an insulating liner 12 which may be made of "Insulcrete," "Insulag," or other suitable self-supporting refractory material. I do not claim to be the inventor of any particular refractory material compound, but merely list two of such compounds which I have found to be satisfactory by their trade names. Their composition is a secret of the manufacturer, and may vary somewhat, but did not appreciably vary during the year 1945, and it is the composition they had then that is specifically intended. "Insulag" and other refractory materials suitable for my present purposes are described more fully in the U. S. Patent to Coffman 2,361,383 of October 31, 1944, on page two, column two, lines 20 to 62 inclusive. Any good refractory compound made by any reputable insulating material company will certainly be found to be satisfactory. The insulation may also be retained in shape by a metal liner if necessary or desired. Each chamber is provided with an inlet 14 at the upper extremity and an outlet 16 at the lower extremity. Gases entering the inlet 14 pass through a perforated distributing plate 16, thence through the catalyst bed 18 which is supported on a screen 20, and finally leave through outlet 16. While the top of the catalyst bed has been shown at 22, it may if desired extend up into close proximity or into contact with distributor 16.

When a series of conversion and regeneration cycles is carried out in the chamber of Figure 1, portions of the catalyst adjacent to the walls of the lower half of the chamber become carbonized to a much greater extent than the remainder of the catalyst bed, as described above. This portion of only partially regenerated catalyst is indicated in Figure 1 by numeral 24. It will be noted that a quite well defined area is involved, and examination shows that a relatively sharp curve of demarcation separates the main body of well regenerated catalyst from the unregenerated and coked portion. Accordingly, the useful part of the catalyst bed is a cylinder in the upper portion and tapers in a curve toward the outlet. I have also found that a small cone of coked-up catalyst is formed along the axis of the catalyst bed at the outlet end when chambers of fairly large diameter are utilized. This is likewise designated by numeral 24 in Figure 1. The precise locations of these areas are of course dependent upon the operating conditions of temperature, pressure and flow rate used in the conversion and in the regeneration portions of the cycle, upon the length of each part of the cycle, and upon the composition of the reaction mixture and of the regeneration gas.

For a given process cycle it is a simple matter, once the existence of these zones of unreactivated catalyst has been recognized, to carry out the cycle a number of times and then to remove the catalyst carefully and to ascertain the shape of that portion of catalyst bed which undergoes substantially complete and uniform regeneration. I then construct a similar chamber for use in the same process cycle having an internal shape altered to conform to the surface of demarcation between regenerated and unregenerated catalyst in the completely cylindrical catalyst bed just described. In actual practice I have merely rebuilt the interior of the same catalyst case to the necessary extent. This is a comparatively simple job and only requires removal of the screen, and removal of the lower portion of the insulating liner and replacing the latter with an insulating liner of the necessary shape. The altered chamber is shown in Figure 2. It will be noted that the cross-section decreases gradually in the lower half to provide a shape corresponding to the curve separating the regenerated and the unregenerated catalyst in Figure 1. While it is not necessary to do so, I find that somewhat improved results are obtained by shifting the screen 20 toward the bottom and continuing the curved tapered inner surface of the chamber to a lower point than the point corresponding to the origin of outlet conduit 16 in the chamber of Figure 1. It will be seen that the construction of Figure 2 is accomplished by providing a portion of the insulating liner of uniform thickness in the upper half of the chamber and a portion 26 of regularly increasing thickness in the lower half of the chamber, thus forming the desired curved taper and also providing desired extra insulation in the outlet part of the chamber protecting the shell from overheating.

One type of catalyst chamber which has been used in high temperature cracking of petroleum distillates over a bauxite catalyst is a 12' x 13' carbon steel cylindrical vessel which is lined on the inside wall with nine inches of "Insulcrete." In the conventional form, as shown in Figure 1, the side wall of the chamber and the bottom meet at right angles with resulting formation of a zone 24 of carbonized catalyst as described above. In the modification of my invention for use in the same conversion, the same or a substantially identical steel vessel is used, with the upper half being lined with nine inches of "Insulcrete"; this lining continues into the lower half of the vessel with an increasing thickness as shown in Figure 2 so chosen as to conform to the desired shape. By this construction not only are the zones at the side of the outlet portion of the chamber eliminated, but likewise that small cone of unregenerated catalyst appearing just above the screen 20 at the axis of the chamber in Figure 1. Formation of hot spots with resulting severe gas production is completely obviated by operating in the improved chamber. Furthermore, the wall failures frequently encountered in the operation of the conventional chamber do not occur.

While I have shown and described one specific modification of my invention, it will be obvious that various modifications thereof may be constructed and utilized without departing from the broader aspects of the invention, as defined in the accompanying claims.

I claim:

1. The method of modifying the construction of a given catalytic reactor so that maximum catalyst reactivation and minimum coking during reactivation will occur which comprises filling a cylindrical catalyst reactor with a stationary bed of solid catalyst particles, passing a fluid stream of organic material to be converted through said bed at conversion conditions of temperature, pressure and flow rate, stopping the flow of organic material after said catalyst becomes substantially deactivated by accumulations of carbonaceous matter thereon and passing a stream of oxygen-containing gas through said bed at catalyst-reactivating conditions of temperature, pressure and flow rate, repeating the above-described conversion-reactivation cycle a plurality of times, then determining the surface of demarcation in the outlet region of said reactor between catalyst which has been substantially completely reactivated in said reactivation steps and catalyst which has become coked due to incomplete reactivation in said reactivation steps because of slow flow rate therethrough, and then shaping the reactor walls adjacent the outlet end of said catalytic reactor in conformity with a surface corresponding to said surface of demarcation which had been previously determined.

2. An improved catalyst chamber for alternate conversion of organic reactants at high temperatures and oxidative reactivation of catalyst, comprising an outer substantially cylindrical vertical shell, a liner for said shell comprising heat-insulating material and formed of substantially uniform thickness in the upper half of the shell and of increasing thickness in the lower half of the shell as the bottom is approached thereby forming a catalyst-receiving chamber having its upper portion cylindrically shaped and its lower portion tapered and more completely insulated, a fluid inlet at the upper extremity of said chamber, a fluid outlet at the lower extremity of said chamber, a stationary bed of catalyst particles within said chamber, said tapered portion being continuously curved and so shaped that fluid passed through said chamber flows through all portions of the catalyst in the bottom section of the chamber at rates of flow not sufficiently below the average rate of flow therethrough as to cause uneven accumulation of carbonaceous deposits therein, and a catalyst support member disposed in the continuously curved portion of said chamber to support said bed.

3. In a catalytic system wherein there are passed through a stationary bed of solid catalyst particles alternately a stream of hot hydrocarbons and a stream of oxygen-containing gas for burning carbonaceous matter from the catalyst bed, the improvement which comprises a catalyst chamber provided with an inlet means and an outlet means at opposite extremities thereof, a bed of catalyst disposed within said chamber, said chamber being substantially circular in cross-section throughout, and being continuously curved and tapered toward the outlet to correspond in shape to the outlines of the region of completely regenerated catalyst in a wholly cylindrical catalyst chamber of otherwise similar structure when operated on conversion and regeneration cycles under identical conditions, said bed terminating in said continuously curved portion.

4. A catalyst case having a chamber for retaining a bed of granular catalyst, said case having an inlet in its upper portion communicating with said chamber and an outlet in its lower portion of less cross sectional area than the central portion of said chamber and communicating with said chamber, the walls of said chamber being continuously curved and gradually tapered inward toward said outlet to reduce the cross sectional area of the chamber gradually and smoothly to that of said outlet without any abrupt change in direction of the inner surface of said walls, whereby the formation of regions of incompletely reactivated catalyst in said chamber during the use of said catalyst case is obviated by the shape of said chamber which is without abrupt changes in the direction of the walls leading to the outlet, and a catalyst retaining member disposed in the continuously curved portion of said chamber to retain said granular catalyst.

CHAS. L. ROGERS.

REFERENCES CITED

The following references are of record in the file of this patent:

UNITED STATES PATENTS

| Number | Name | Date |
| --- | --- | --- |
| 2,195,738 | Ridler et al. | Apr. 2, 1940 |
| 2,212,583 | Broderson et al. | Apr. 27, 1940 |
| 2,244,612 | Crowley | June 3, 1941 |
| 2,440,436 | Creel | Apr. 27, 1948 |

FOREIGN PATENTS

| Number | Country | Date |
| --- | --- | --- |
| 554,691 | Great Britain | July 15, 1943 |